(12) United States Patent
Grbovic

(10) Patent No.: US 8,295,067 B2
(45) Date of Patent: Oct. 23, 2012

(54) POWER CONVERTER USING A RECTIFIER WITH NORMALLY ON TRANSISTORS

(75) Inventor: Petar Grbovic, Pacy sur Eure (FR)

(73) Assignee: Schneider Toshiba Inverter Europe SAS, Pacy-sur-Eure (FR)

( * ) Notice: Subject to any disclaimer, the term of this patent is extended or adjusted under 35 U.S.C. 154(b) by 346 days.

(21) Appl. No.: 12/781,296

(22) Filed: May 17, 2010

(65) Prior Publication Data

US 2010/0295523 A1 Nov. 25, 2010

(30) Foreign Application Priority Data

May 19, 2009 (FR) ...................................... 09 53307

(51) Int. Cl.
*H02M 5/45* (2006.01)
*H02M 7/10* (2006.01)
*H02M 7/757* (2006.01)
*H02M 5/42* (2006.01)
*H02M 7/04* (2006.01)
*H02M 7/68* (2006.01)

(52) U.S. Cl. ................. 363/89; 363/37; 363/68; 363/79

(58) Field of Classification Search .................. 323/289; 363/37, 68, 79, 84, 89
See application file for complete search history.

(56) References Cited

U.S. PATENT DOCUMENTS

| 4,700,281 A * | 10/1987 | Thorn et al. ..................... 363/37 |
| 5,045,991 A * | 9/1991 | Dhyanchand et al. .......... 363/89 |
| 6,195,276 B1 * | 2/2001 | Sebille .......................... 363/127 |
| 2007/0189044 A1 * | 8/2007 | Liu et al. ........................ 363/34 |

FOREIGN PATENT DOCUMENTS

| EP | 1 347 564 A2 | 9/2003 |
| JP | 59-123468 | 7/1984 |
| JP | 10-178781 | 6/1998 |

OTHER PUBLICATIONS

U.S. Appl. No. 12/942,370, filed Nov. 9, 2010, Grbovic.

* cited by examiner

*Primary Examiner* — Adolf Berhane
*Assistant Examiner* — Gary Nash
(74) *Attorney, Agent, or Firm* — Oblon, Spivak, McClelland, Maier & Neustadt, L.L.P.

(57) ABSTRACT

The invention relates to a power converter comprising, in particular, a rectifier comprising at least one switching leg provided with two transistors (T1-T6) connected in series. The transistors (T1-T6) are of the normally ON field-effect type, for example JFETs, and are each controlled by a gate control device (CT1-CT6). Each gate control device comprises, in particular:
an output (OUT1) connected to the gate (G) of the controlled transistor,
a voltage rectifier element connected between the output of the control device and an input (in1, in3) of the converter,
a capacitor (C11) connected between the source (S) of the transistor and a point situated between the output of the control device and the voltage rectifier element.

9 Claims, 3 Drawing Sheets

POWER CONVERTER USING A RECTIFIER WITH NORMALLY ON TRANSISTORS

Figure 1:
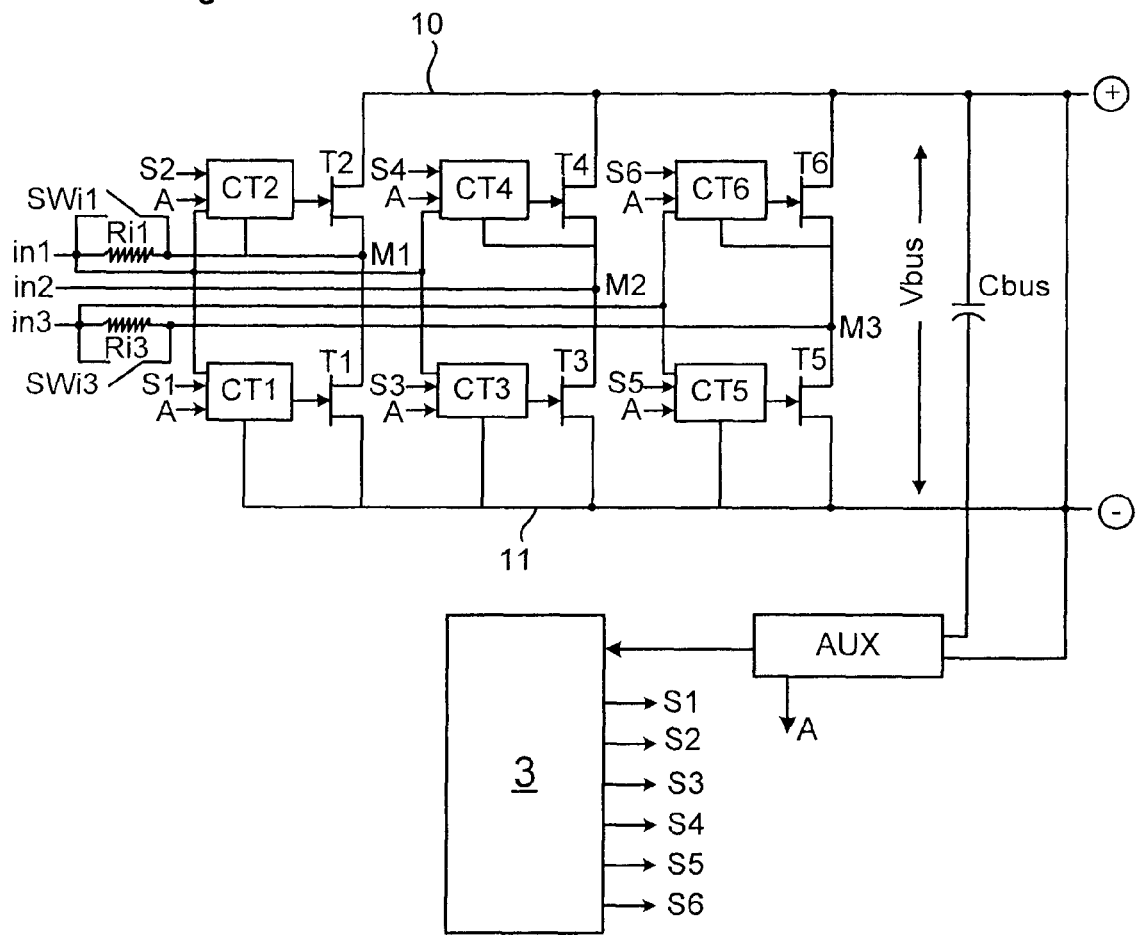

The present invention relates to a power converter using a rectifier with normally ON transistors. Said power converter is intended for use, for example, in a variable speed drive, an uninterruptible power supply system, an active filter or a DC-DC converter.

As is known, a power converter comprises a number of inputs, connected to the network, for example three inputs if it is connected to a three-phase network. Connected to its inputs, the converter has a rectifier for transforming the AC voltage supplied by the network into a DC voltage. The converter also has a power supply bus provided with a positive line and a negative line and to which is applied the DC voltage, and a bus capacitor connected between the positive line and the negative line of the power supply bus and intended to keep the DC voltage constant on the bus. In a variable speed drive type power converter, the power converter comprises a number of switching legs, generally three switching legs, situated downstream of the bus capacitor. Each switching leg is connected between the positive line and the negative line of the power supply bus and may comprise, for example, two switching transistors controlled to transform the DC voltage into a variable voltage intended for an electrical load.

The rectifier placed at the input of the converter can be of active type, also comprising a number of switching legs each provided with at least two transistors in series. The transistors are each controlled by a gate control device in order to be able to transform the AC voltage from the network into a DC voltage applied to the power supply bus. This type of converter with an active rectifier at the input is commonly referred to as an "active front end". In this type of rectifier, it has proved advantageous to employ field-effect transistors of the normally ON type because of their high performance characteristics.

However, given that the rectifier of the converter uses normally ON components which therefore allow the current to pass when no voltage is applied to their gates, it is essential to ensure that the switching legs including these components do not short-circuit the inputs of the converter and the bus capacitor, preventing the power supply bus from being powered with voltage and the auxiliary power supply system from being charged, when no control voltage can be applied to their gates, that is to say:

when starting up the power converter when the DC voltage on the power supply bus has not yet reached a sufficient level or, in the event of a malfunction in the power converter, for example in the auxiliary power supply system.

The aim of the invention is to propose a power converter in which the rectifier using normally ON type transistors cannot short-circuit the inputs of the converter and the bus capacitor when starting up the power converter or in the event of a malfunction in the power converter.

This aim is achieved by a power converter comprising:

several inputs connected on the one hand to an energy source and on the other hand to a rectifier, said rectifier being connected to a power supply bus provided with a positive line and a negative line and to which is applied a DC voltage, a bus capacitor, connected downstream of the rectifier between the positive line and the negative line of the power supply bus, the rectifier comprising a switching leg connected between the positive line and the negative line of the power supply bus, the switching leg comprising at least two transistors connected in series, a connection midpoint situated between two transistors of the switching leg being connected to an input of the converter, via a current limiting element, the transistors being of the normally ON field-effect type and each controlled by a gate control device, characterized in that each gate control device comprises:

an output connected to the gate of the transistor, a voltage rectifier element connected between the output of the control device and an input of the converter, upstream of the current limiting element, a capacitor connected between the source of the transistor and a point situated between the output of the control device and the voltage rectifier element.

According to a particular feature of the invention, the gate control device comprises a resistor mounted in series with the voltage rectifier element.

According to another particular feature, the gate control device comprises a gate resistor connected between the gate of the transistor and the output of the gate control device.

According to another particular feature, the gate control device comprises a Zener diode connected between the gate of the transistor and a positive terminal of the control device.

According to another particular feature, the transistors are of JFET type.

According to another particular feature, the transistors are fabricated from silicon carbide or gallium nitride.

According to another particular feature, the converter comprises a switch mounted in parallel with the current limiter element.

According to the invention, the current limiter element is, for example, a resistor and the voltage rectifier element is, for example, a diode.

Figure 4:
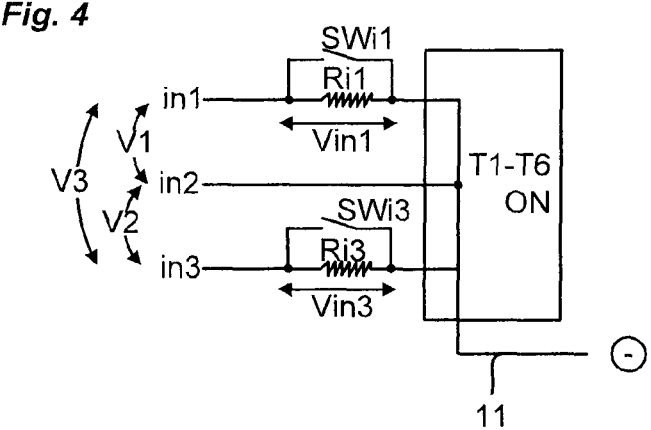
Figure 2:
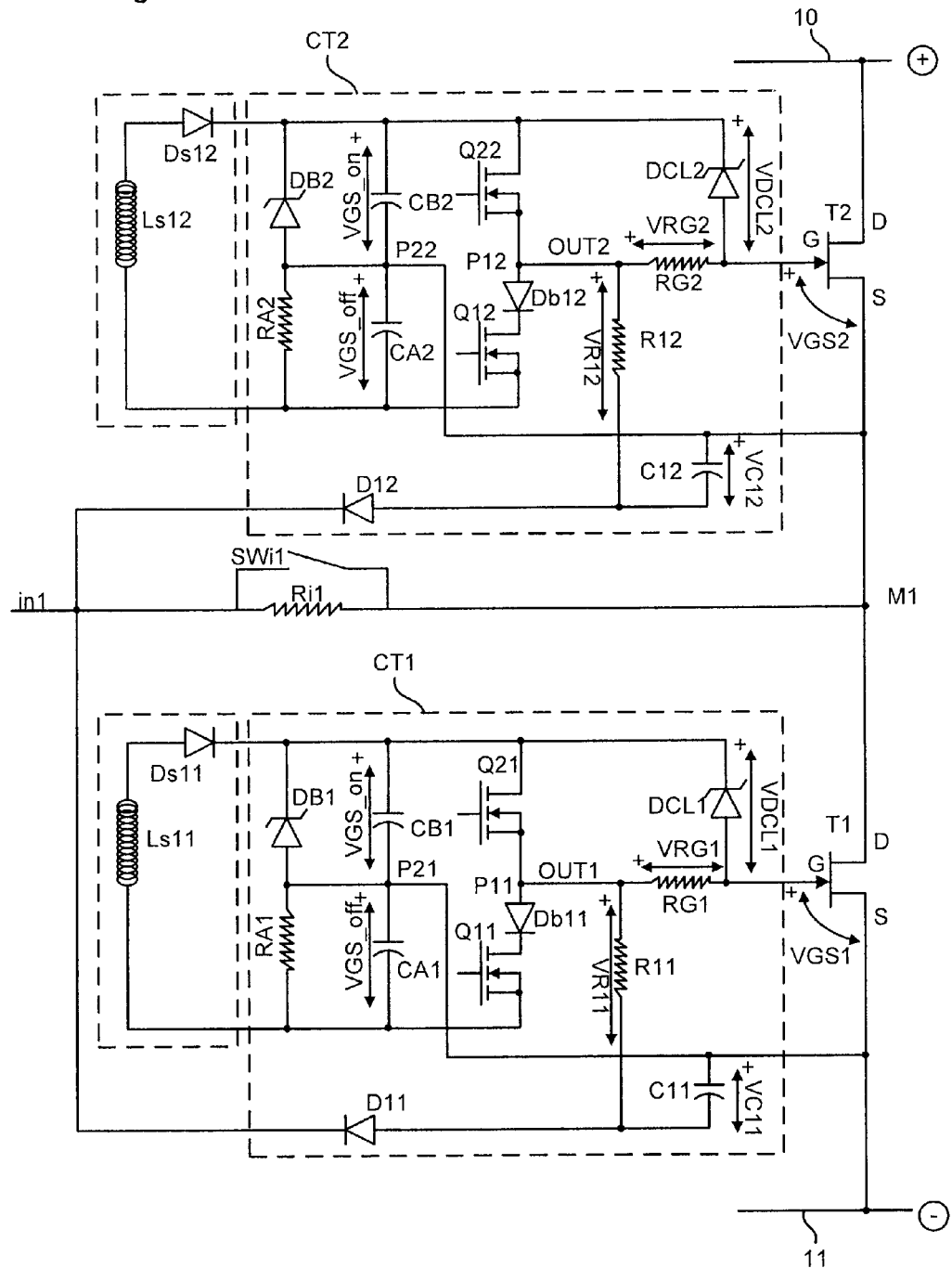
Figure 3:
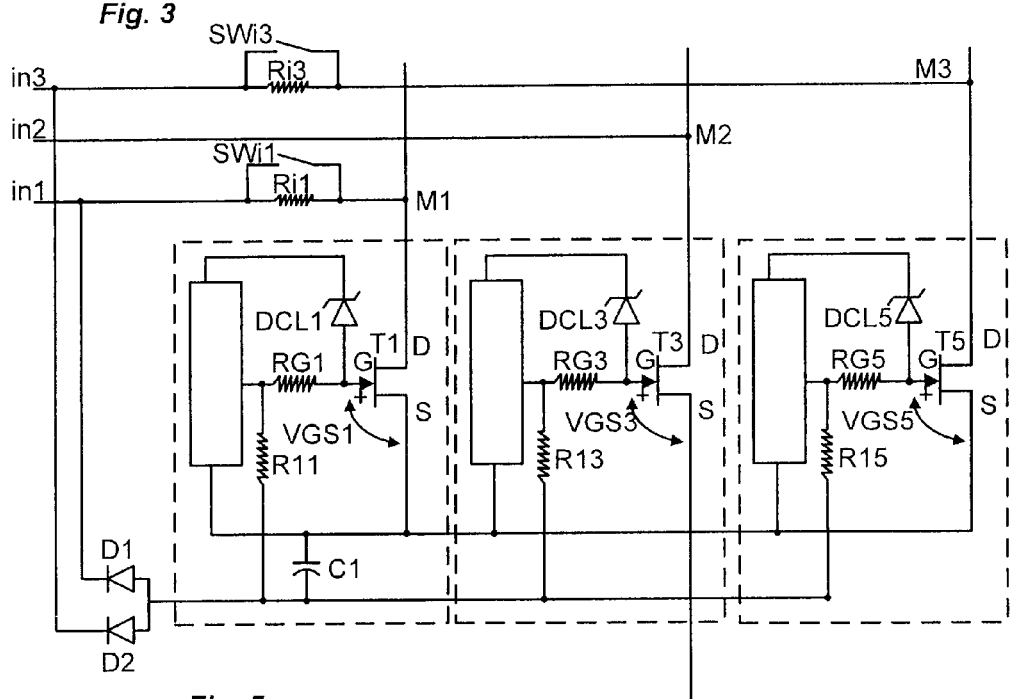
Figure 5:
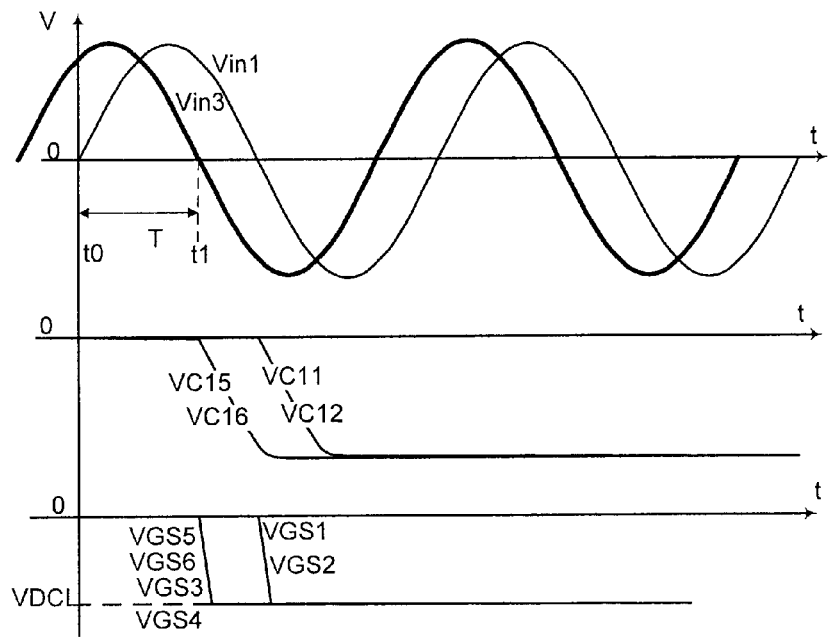

Other features and advantages will emerge from the following detailed description by referring to an embodiment given by way of example and represented by the appended drawings in which:

FIG. 1 partly represents a power converter and more particularly the active rectifier used in the converter, FIG. 2 represents a switching leg used in the rectifier of FIG. 1 and the control devices for the transistors of the switching leg, FIG. 3 represents the bottom transistors of the rectifier of the converter and a particular embodiment of the invention, FIG. 4 gives a simplified illustration of the situation on starting up the converter when all the transistors of the rectifier are on and the inputs of the converter are short-circuited, FIG. 5 uses a number of curves to illustrate the operation of the invention.

A power converter can be used, for example, in a variable speed drive, an uninterruptible power supply (UPS) system, an active filter or a DC-DC converter. It is designed to receive an input voltage from a source and to apply an output voltage, for example, to an electrical load.

Referring to FIG. 1, a power converter typically comprises a power supply bus provided with a positive line 10 and a negative line 11 and to which is applied a DC voltage Vbus. The power converter also comprises a bus capacitor Cbus connected between the positive line 10 and the negative line 11 of the power supply bus and designed to keep the DC voltage Vbus constant on the power supply bus. A power converter of variable speed drive type also comprises, downstream of the bus capacitor Cbus, a switching module (not represented in FIG. 1) with n phases that has, on each phase, 2n switching transistors. The switching module has, for example, three phases and therefore comprises three switching legs each connected between the positive line 10 and the negative line 11 of the power supply bus. Each switching leg comprises a top transistor and bottom transistor separated by a connection midpoint linked to the electrical load.

Upstream of the bus capacitor Cbus, there is a power converter comprising a rectifier. As represented in FIG. 1, the rectifier can be active, that is to say that it comprises switching legs designed to transform the AC voltage applied to the inputs in1, in2, in3 of the converter and originating from the network into a DC voltage. If the network is a three-phase network as in FIG. 1, the converter comprises three inputs in1, in2, in3 each connected to a switching leg. The three switching legs of the rectifier are each connected in parallel with the bus capacitor Cbus, between the positive line 10 and the negative line 11 of the power supply bus. Each switching leg comprises a top transistor and a bottom transistor separated by a connection midpoint M1, M2, M3 linked to an input in1, in2, in3 of the converter.

Of the three inputs in1, in2, in3, at least two are connected to a switching leg via a preload circuit. The preload circuit comprises a current limiter element such as, for example, a resistor, an inductor or a JFET-type transistor with which to limit the current on starting up the converter and connected to the input of the converter. In the appended figures, the inputs in1 and in3 are thus connected respectively to the first switching leg and to the third switching leg of the rectifier via the resistors Ri1 and Ri3. Each preload circuit also comprises, in parallel with the resistor Ri1, Ri3, a switch SWi1, SWi3 that is off when the converter is started up and switched on once the auxiliary power supply AUX and the rectifier are ready to operate normally.

According to the invention, each transistor T1-T6 of the rectifier is of the normally ON field-effect type (field effect transistor, FET). A field-effect transistor such as, for example, a JFET or a MOSFET, is a known power electronic switch which comprises a control gate (G), the function of which is to allow or prevent the passage of a current between a drain (D) and a source (S). Such a transistor is said to be of normally ON type if the voltage $V_{GS}$ between the gate and the source is close to zero. This means that the drain-source path is passing or conductive in the absence of control voltage $V_{GS}$. In the presence of a negative control voltage $V_{GS}$ between its gate and its source, the normally ON field-effect transistor is switched OFF. A JFET-type transistor is switched OFF by applying a gate-source voltage $V_{GS}$ that is for example at least equal to −15 Volts and a MOSFET transistor with a voltage $V_{GS}$ for example at least equal to −5 Volts.

The field effect transistors employed in the power converter of the invention will, for example, be fabricated from a wide band-gap material such as, for example, silicon carbide or gallium nitride. As is known, a JFET transistor produced from a wide band-gap material of normally ON type offers the advantages of being faster to switch, of generating fewer conduction losses in the passing state (low resistance $R_{Dson}$ in the passing state), of having a better temperature resistance and of having a smaller size. Hereinafter in the description and in the appended figures, the transistors T1-T6 that are used are, for example, of JFET type.

Each field-effect transistor T1-T6 of the switching legs is switched OFF by virtue of a specific gate control device CT1-CT6. Each gate control device CT1-CT6 is powered (A) by virtue of an auxiliary power supply system AUX connected between the positive line 10 and the negative line 11 of the power supply bus, upstream of the bus capacitor Cbus, and applies to the transistor a gate voltage $V_G$ to switch the transistor ON or OFF. In addition to the power supply (A), each control device CT1-CT6 receives, from a central control system 3, pulse-width modulated (PWM) control signals S1 to S6 that observe a control law executed by the central control system 3. Each control device CT2, CT4, CT6 of the top transistors T2, T4, T6 is connected to the connection midpoint M1, M2, M3 of the switching leg of its transistor, while each control device CT1, CT3, CT5 of the bottom transistors T1, T3, T5 is connected to the negative line 11 of the power supply bus.

FIG. 2 shows, for example, the control devices CT1, CT2 of the transistors T1, T2 of the first switching leg of the rectifier. The references of the components used in the control devices that are not described or not represented in the drawings are chosen with notations that follow a scheme that is identical to that used for the description of the control device CT1 given hereinbelow.

With reference to FIG. 2, a control device, for example CT1, of the bottom transistor T1 of the rectifier comprises in particular two transistors Q11, Q21 linked in series and a set of two capacitors $C_{A1}$, $C_{B1}$ also mounted in series. The output of the control device is connected on the one hand to the connection midpoint P11 situated between the two transistors Q11, Q21 and on the other hand to the gate of the controlled transistor T1. A connection midpoint P21 situated between the two capacitors $C_{A1}$, $C_{B1}$ is connected to the source S of the transistor T1. The transistor Q11 of the control device is of the normally ON type while the transistor Q21 of the control device is of the normally OFF type. A blocking diode $D_{b11}$ is positioned in series with the transistors Q11, Q21 of the control device. The auxiliary power supply system AUX powers the control device CT1 through a diode $D_{s11}$ and an inductor $L_{s11}$ which constitutes the secondary of the transformer of the auxiliary power supply system AUX by generating the voltages $V_{GS\_ON}$ and $V_{GS\_OFF}$ needed respectively to switch the transistor T1 on and off. From the voltages $V_{GS\_ON}$ and $V_{GS\_OFF}$, the transistors Q11, Q21 apply the gate voltage $V_G$ to the JFET transistor to switch it OFF or ON.

According to the invention, the control device also comprises a voltage rectifier element connected between the output OUT1 of the control device and the input in1 of the converter, upstream of the resistor of the preload circuit Ri1. The voltage rectifier element can be a diode D11 as represented in FIG. 2, a thyristor or a transistor of IGBT or RBIGBT ("reverse blocking" IGBT) type. The control device comprises an energy storage element such as a capacitor C11 connected between the source of the controlled transistor T1 and the point situated between the output OUT1 of the control device and the diode D11. Moreover, as represented in FIG. 2, the control device can also comprise a resistor R11 connected between the diode D11 and its output OUT1. The resistor R11 has a high value, for example several kiloOhms. The capacitor C11 is then connected on the one hand to the source of the transistor T1 and on the other hand to the point situated between the resistor R11 and the diode D11. A gate resistor $R_{G1}$ is also connected between the output of the control device and the gate G of the transistor T1. The resistor R11 can be connected to the output of the control device upstream or downstream of the gate resistor $R_{G1}$. The control device finally comprises a Zener diode $D_{CL1}$ which is, for its part, connected between the gate of the transistor T1 and the positive potential of the control device. This Zener diode $D_{CL1}$ is used to limit the gate-source voltage $V_{GS1}$ and thus protect the PN junction formed between the gate and the source of the controlled transistor T1.

The architecture of the third switching leg with the transistors T5 and T6 is identical to that of the first switching leg represented in FIG. 2. The architecture of the second switching leg is also identical, apart from the fact that the outputs of the two control devices are connected via the resistors R13, R14 and the diodes D13, D14 to the first input in1 or to the third input in3 of the converter and not to the second input in2. This is mainly linked to the fact that the second input does not include any preload circuit. It would be quite possible to place a preload circuit on the second input as on the other inputs of the converter. In this configuration, the outputs of the control devices of the transistors T3, T4 of the second switching leg would then be connected to the second input in2 of the converter.

For the bottom transistors of the switching legs of the rectifier, it is possible to simplify the structures of the control devices employed, as represented in FIG. 3. The simplification consists in using only a single capacitor C1 for all three control devices instead of a different capacitor C11, C13, C15 for each control device, this capacitor C1 being connected between the sources S of the transistors T1, T3, T5 and the two inputs in1 and in3. Similarly, only two diodes D1 and D2 are employed instead of three diodes D11, D13, D15. In FIG. 3, the parts comprising the known components of the control devices are represented by a simple rectangle.

The principle of the invention consists in blocking the transistors T1-T6 which are of normally ON type when starting up the converter or in the event of a malfunction of the auxiliary power supply AUX to avoid, in particular, short-circuiting the inputs of the converter and short-circuiting the bus capacitor, preventing the power supply bus from being powered with voltage.

The operation of the invention is explained hereinbelow in conjunction with the curves represented in FIG. 5 and with the simplified representation of FIG. 4.

On start-up, as represented in FIG. 4, since all the transistors are passing, the inputs in1, in2, in3 of the converter are short-circuited and therefore the negative line 11 and the positive line 10 of the power supply bus are short-circuited at one and the same point.

In a three-phase converter, it is known practice to apply voltages V1, V2, V3 between the phases as represented in FIG. 4, leading to the appearance of the voltages Vin1 and Vin3 on the inputs in1 and in3, at the terminals of the preload resistors Ri1, Ri3. The two voltages Vin1 and Vin3 are sinusoidal voltages phase-shifted by $\pi/3$ as represented in the first curves of FIG. 5. Because of this, these two voltages are periodically negative.

At t0, the voltages Vin1 and Vin3 are, for example, both positive and the diodes D11 to D16 are therefore blocking. At t1, after a certain delay T, the voltage Vin3 becomes negative. The diodes D15 and D16 of the control devices CT5, CT6 become passing. The capacitors C15 and C16 are charged by the voltage Vin3. Since the voltage Vin3 is negative, the voltages $V_{C15}$ and $V_{C16}$ at the terminals of the capacitors C15 and C16 are also negative. At the same moment, the gate-source junctions of the transistors T5 and T6 of the third switching leg are charged with a negative voltage via the resistors R15 and R16. When the gate-source voltages $V_{GS5}$ and $V_{GS6}$ reach a sufficient negative value, the transistors T5 and T6 are blocked. In the control device, since the gate-source voltages $V_{GS5}$ and $V_{GS6}$ are negative, the blocking diodes $D_{b15}$, $D_{b16}$ become blocking and prevent a leakage current from passing outside of the control device.

Similarly, when Vin1 becomes negative, the diodes D11, D12 linked to the first switching leg become passing. The capacitors C11 and C12 are therefore charged negatively from the voltage Vin1. The voltages $V_{C11}$ and $V_{C12}$ at the terminals of the capacitors C11 and C12 are then negative. At the same time, the gate-source junctions of the transistors T1 and T2 are negatively charged via the resistors R11 and R12.

When the gate-source voltages $V_{GS1}$ and $V_{GS2}$ reach a certain negative threshold, the transistors T1 and T2 are blocked.

With respect to the second switching leg, depending on whether it is connected to the first input in1 or the third input in3 of the capacitor, the gate-source voltages $V_{GS3}$, $V_{GS4}$ become negative at the same time as those of the transistors of the first switching leg, or at the same time as those of the third switching leg. When the negative threshold is reached for these voltages, the transistors T3 and T4 are blocked.

When all the transistors T1-T6 of the rectifier are blocked, the bus capacitor Cbus can be charged via the internal diodes of the transistors T1-T6. Once the bus capacitor Cbus is charged, the auxiliary power supply AUX has started up and the control devices CT1-CT6 of the transistors can then operate normally to switch the transistors of the rectifier OFF or ON. Once the switches SWi1 and SWi3 are closed, the rectifier can operate normally.

The way the embodiment of FIG. 3 operates is identical with respect to each of the bottom transistors T1, T3, T5 of the rectifier to that described hereinabove.

Obviously, it is possible, without departing from the framework of the invention, to imagine other variants and refinements of detail and even consider the use of equivalent means.

The invention claimed is:

1. A power converter comprising:
several inputs connected to an energy source and to a rectifier, said rectifier being connected to a power supply bus provided with a positive line and a negative line and to which is applied a DC voltage,
a bus capacitor, connected downstream of the rectifier between the positive line and the negative line of the power supply bus,
the rectifier comprising a switching leg connected between the positive line and the negative line of the power supply bus, the switching leg comprising at least two transistors connected in series, a connection midpoint situated between two transistors of the switching leg being connected to an input of the converter, via a current limiting element,
the transistors being of the normally ON field-effect type and each controlled by a gate control device,
wherein each gate control device comprises:
an output connected to the gate of the transistor,
a voltage rectifier element connected between the output of the gate control device and an input of the converter, upstream of the current limiting element,
a capacitor connected between the source of the transistor and a point situated between the output of the gate control device and the voltage rectifier element.

2. The power converter according to claim 1, wherein the gate control device comprises a resistor mounted in series with the voltage rectifier element.

3. The power converter according to claim 1 or 2, wherein the gate control device comprises a gate resistor connected between the gate of the transistor and the output of the gate control device.

4. The power converter according to claim 1 or 2 wherein the gate control device comprises a Zener diode connected between the gate of the transistor and a positive terminal of the gate control device.

5. The power converter according to claim 1 or 2 wherein the transistors are of JFET type.

6. The power converter according to claim 5, wherein the transistors are fabricated from silicon carbide or gallium nitride.

7. The power converter according to claim 1 or 2, wherein the converter comprises a switch mounted in parallel with the current limiter element.

8. The power converter according to claim 1 or 2, wherein the current limiter element is a resistor.

9. The power converter according to claim 1 or 2, wherein the voltage rectifier element is a diode.

* * * * *